United States Patent [19]
Blondel et al.

[11] Patent Number: 5,379,148
[45] Date of Patent: Jan. 3, 1995

[54] CONNECTION WITH AMPLIFYING OPTICAL FIBERS

[75] Inventors: Jean-Pierre Blondel, Viroflay; José Chesnoy, Paris, both of France

[73] Assignee: Alcatel N.V., Amsterdam, Netherlands

[21] Appl. No.: 961,117

[22] Filed: Oct. 14, 1992

[30] Foreign Application Priority Data

Oct. 15, 1991 [FR] France ............... 91 12674

[51] Int. Cl.[6] .................... G02B 6/26; G02B 6/42; H04B 10/16
[52] U.S. Cl. .................... 359/341; 372/6
[58] Field of Search ............ 359/341; 372/6

[56] References Cited

U.S. PATENT DOCUMENTS

| | | | |
|---|---|---|---|
| 4,843,356 | 6/1989 | Lusignan et al. | 333/236 |
| 5,027,079 | 6/1991 | Desurvire et al. | 359/341 |
| 5,035,481 | 7/1991 | Mollenauer | 359/341 |
| 5,039,199 | 8/1991 | Mollenauer et al. | 359/334 |
| 5,050,949 | 9/1991 | Di Giovanni et al. | 359/341 |
| 5,058,974 | 10/1991 | Mollenauer | 359/341 |
| 5,111,334 | 5/1992 | Heidemann | 359/341 |
| 5,117,303 | 5/1992 | Desurvire et al. | 359/341 |

FOREIGN PATENT DOCUMENTS 0421675  4/1991  European Pat. Off. .

OTHER PUBLICATIONS

Urquhart et al, "Long span fiber amplifiers", *Applied Optics* v 29 n 24 (20 Aug. 90), pp. 3503-3509.

Spirit et al, "5 Gbits/s +10 dBm Lossless Transmission in 10 km Distributed Erbium Fibre Amplifier", *Electronics Letters* v 26 n 20 (27 Sep. 90), pp. 1658-1659.

C. R. Giles, "Propagation of Signal and Noise in Concatenated Erbium-Doped Fiber Optical Amplifiers", *Journal of Light Wave Technology*, vol. 9, No. 2, Feb. 1991, pp. 147-154.

Primary Examiner—Nelson Moskowitz
Attorney, Agent, or Firm—Robbins, Berliner & Carson

[57] ABSTRACT

Transmission line sections in a connection comprise passive portions transmitting the signal without compensating for its natural attenuation and occupying 15% to 65% of the length of the section. They also include active portions that amplify the signal. The invention is particularly applicable to making intercontinental connections.

5 Claims, 1 Drawing Sheet

CONNECTION WITH AMPLIFYING OPTICAL FIBERS

The present invention relates to providing a connection enabling information to be transmitted over a distance that may be very long, which distance is typically greater than 3000 km for an intercontinental connection. It relates more specifically to an optical fiber connection including amplifying fibers for compensating the natural attenuation that affects signals when they are transmitted without amplification.

BACKGROUND OF THE INVENTION

Such amplifying fibers are conventionally doped with erbium. Initially they were made using lengths that were very short compared with the total length of the connection. They were then "lumped" in amplifiers.

The limitations that need to be taken into account when designing a very long distance connection using erbium-doped amplifying fibers (EDFA) are essentially due to two phenomena:

The accumulation of noise due to amplified simultaneous emission (ASE). In this context, it may be observed that to obtain specified performance (in terms of signal to noise ratio) at the end of a given distance, it is necessary for the output power from the amplifiers (and consequently the mean in-line power) to be greater than a limit value. As the spacing between amplifiers is increased, so said limit value also increases.

Dispersive and non-linear effects. It has been shown that loss of quality in a connection due to these effects increases with increasing mean in-line power.

Various connection configurations have been proposed: in one proposal, amplification is lumped. The connection makes use of lumped amplifiers each integrating all of the active and passive components required for amplification (short amplifying fiber strongly doped with erbium, pump injectors, i.e. pump diodes providing a pump wave, and a multiplexer for injecting said pump wave into the amplifying fiber, . . . ).

A connection of that configuration is described, in particular, in the document "Propagation of signal noise in concatenated erbium-doped fiber optical amplifiers" by C. R. Giles and Emmanuel Desurvie, and published in the Journal of Lightwave Technology, Vol. 9, No. 2, February, 1991.

Another configuration that has been proposed is distributed amplification. This is obtained by compensating the losses to which the signal is subjected by means of a line fiber that is weakly doped and by placing pump injectors along the line, the pump injectors comprising pump diodes and multiplexers.

That connection configuration is described, in particular, in the above-mentioned document.

In order to avoid having mean in-line powers, and thus dispersive and non-linear effects that are too penalizing when using lumped amplification, it is necessary for distances between amplifiers to be short: about 30 km to 50 km.

The distributed amplification configuration is more advantageous from the point of view of noise accumulation. Under such circumstances, the distance between pump injectors is limited by the pump power that needs to be injected into the fiber. 100 km appears to be the maximum distance that can be considered, and requires relatively high pump power to be injected (more than 30 mW).

Another possible configuration is mentioned in patent document EP-A 421 675 (ATT). That configuration comprises amplification that is made more nearly continuous by having varying concentrations of dopant such as erbium between two pump injectors. The concentrations are chosen to make signal power more uniform so as to minimize non-linear effects. Starting from a pump injector, the concentration in successive lengths increases so as to compensate for the decreasing power of the pump light. It is specified that some lengths may have no doping at all.

That configuration suffers from drawbacks comparable to those of the other, previously-proposed configurations.

Particular objects of the present invention are to provide a connection in which the spacing between pump injectors is greater than it is with lumped amplification and in which the pump power required is compatible with system constraints without non-linear effects becoming too troublesome.

SUMMARY OF THE INVENTION

To meet these objects, the present invention provides for at least some of the sections of the transmission line in a connection to include passive lengths situated remotely from the pump injectors and transmitting the signal without compensating its natural attenuation, and active lengths for distributed amplification, amplifying said signal in the proximity of said injector.

BRIEF DESCRIPTION OF THE DRAWING

Embodiments of the invention is described by way of example with reference to the accompanying drawing, in which.

DETAILED DESCRIPTION

Figure 1:
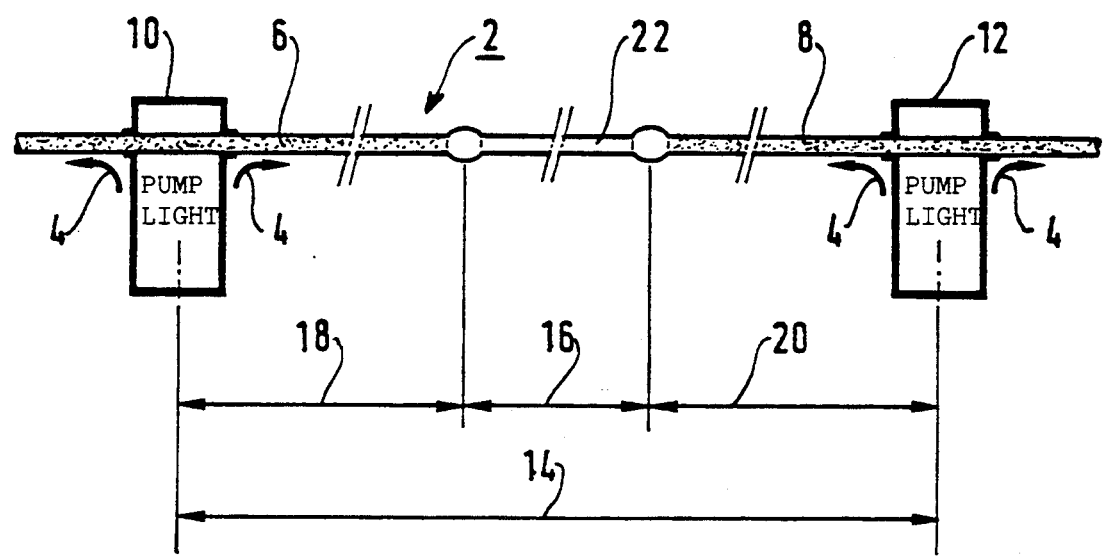
FIG. 1 is a fragmentary view of a first connection in accordance with the present invention.
Figure 2:
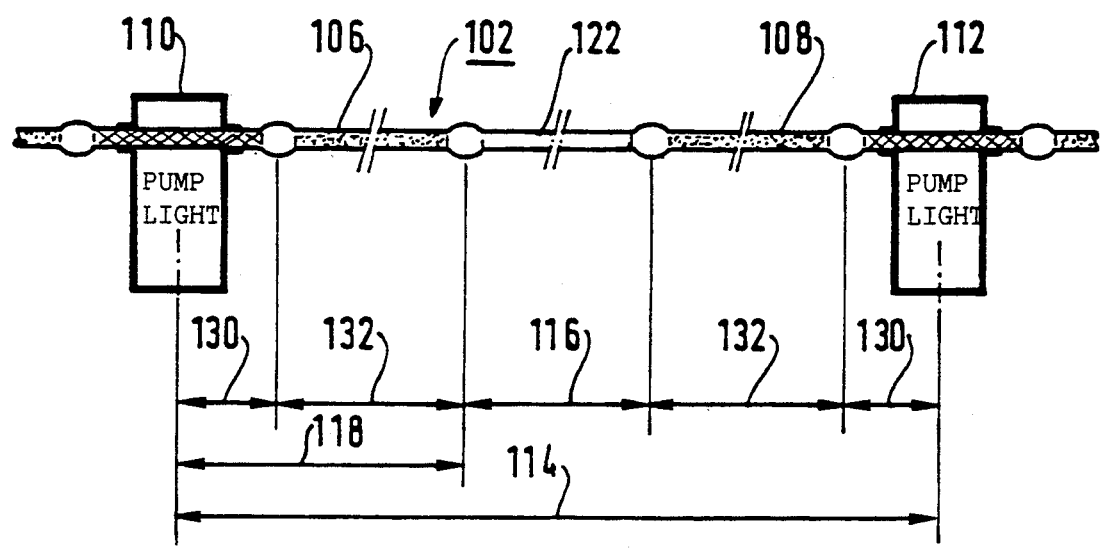
FIG. 2 is a fragmentary view of a second connection in accordance with the present invention.

As shown in FIG. 1, a connection in accordance with the invention includes certain items in common with known connections, at least with respect to the functions specified below.

One such common item is a transmission line 2 constituted by optical fibers. These fibers extend in succession along the line for the purpose of guiding an optical carrier wave. This wave carries a signal to be transmitted, which signal is liable to be transmitted, attenuated, and/or amplified together with said wave. Some of the optical fibers are amplifying fibers 6, 8 doped with appropriate concentrations of dopant. The dopant is suitable for being excited by a pump wave 4 in order to compensate for the attenuation of said carrier wave and of the signal by amplifying them. The pump wave is at a pump frequency that is different from the carrier frequency.

Other common items include localized pump injectors 10, 12 that follow one another along the transmission line, with each of them injecting one of said pump waves therein. Successive sections 14 of the line are delimited by successive injectors. These sections have lengths and they succeed one another in the length direction of the line. They are constituted by said optical fibers.

At least some of the transmission line sections are sections 14 having semi-distributed amplification, each comprising a passive portion 16 and at least one active portion 18, 20. These active and passive portions have lengths and they succeed one another in the length direction of the section. Each active portion 18 is constituted by amplifying fibers and extends within its section from a pump injector 10 for receiving a pump wave 4. The group of portions constituted by the active portions 18 and 20 of a section occupy an "active" fraction of the length of said section, which active fraction is greater than 20% and preferably lies in the range 35% to 85%. The passive portion 16 is constituted by passive optical fibers 22 having no dopant. It is remote from each of the pump injectors 10, 12 then inject a pump wave into said section. It occupies a "passive" fraction of the length of said section, which passive fraction is greater than 10% and preferably lies in the range 15% to 65%. A plurality of passive portions may optionally constitute a group.

Preferably, and as shown, each semi-distributed amplification section 14 has two active portions 18 and 20 extending into said section from the two pump injectors 10 and 12 that delimit said section. These two injectors inject respective pump waves 4 into said section.

The second connection of the present invention includes items that perform the same functions as items in the first connection and they are given the same reference numerals, plus 100.

This second connection also includes the following disposition: each active portion 118 comprises, in succession, starting from an injector 110: a lumped amplification portion 130 and then a distributed amplification portion 132 of greater length and lower dopant concentration than said lumped amplification portion. The lumped amplification portion may be integrated in the pump injector 110 to constitute a conventional lumped amplifier.

It appears that the solution proposed by the invention is intermediate between lumped amplification and distributed amplification, as is the above-mentioned configuration with amplification made more uniform. The solution of the present invention may be called a "semi-distributed" configuration. It provides a more effective juxtaposition than before of portions having fibers with low doping (active distributed amplification portions) and portions having non-doped fibers (so-called "white fiber" passive portions), optionally associated with doped fiber portions of short length (less than 100 meters) constituting active portions for lumped amplification.

We claim:

1. A transmission line comprising:
   a plurality of optical fibers extending in succession along the length of said line to guide an optical carrier wave carrying a signal to be transmitted, said optical fibers being divided into groups having respective doping concentrations of a dopant, including at least a first group having a non-zero doping concentration for amplifying said carrier wave and said signal in response to a pump wave having a pump frequency that is different from said carrier frequency to thereby compensate for attenuation of said carrier wave and of said signal,
   a succession of pump injectors following one another along the length of said transmission line to thereby delimit sections of said transmission line, each said section including
      a respective said injector at one end of the respective section for injecting a respective said pump wave into said respective section,
      at least two of said optical fibers of said first group and collectively occupying a first fraction comprising more than 20% of the length of said each section, and
      at least one of said optical fibers of a second group of optical fibers each having a second said doping concentration lower than said first doping concentration and collectively occupying a second fraction comprising more than 10% of the length of said each section;
   wherein within each said section one optical fiber of the first group is directly coupled to said respective injector and is followed by an optical fiber of the second group that is indirectly coupled to said respective injector via said one optical fiber of the first group.

2. A connection according to claim 1, wherein said first fraction lies in the range 35% to 85% of said length and said second fraction lies in the range 15% to 65% of said length.

3. An amplifying optical fiber connection according to claim 1, wherein said each section includes two respective said active portions extending from two said injectors at either end of said section, and a said passive portion between said two active portions.

4. An amplifying optical fiber connection according to claim 2, wherein each said active portion comprises:
   a respective lumped amplification portion that is directly coupled to a respective said injector;
   a respective distributed amplification portion of greater length and lower dopant concentration than said lumped amplification portion that is indirectly coupled to said respective injector via said respective lumped amplification portion.

5. A connection according to claim 1 wherein said optical fibers of the first group constitute active portions of the transmission line and said portions of the second group constitute passive portions of the transmission line having a zero doping concentration.

* * * * *